United States Patent
Ota

(10) Patent No.: US 10,764,497 B2
(45) Date of Patent: Sep. 1, 2020

(54) DOCUMENT CAMERA, METHOD FOR CONTROLLING DOCUMENT CAMERA, AND ELECTRONIC APPARATUS

(71) Applicant: SEIKO EPSON CORPORATION, Tokyo (JP)

(72) Inventor: Katsuya Ota, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 28 days.

(21) Appl. No.: 15/987,494

(22) Filed: May 23, 2018

(65) Prior Publication Data

US 2018/0343389 A1 Nov. 29, 2018

(30) Foreign Application Priority Data

May 29, 2017 (JP) .................. 2017-105176

(51) Int. Cl.
| | |
|---|---|
| H04N 5/232 | (2006.01) |
| H04N 5/225 | (2006.01) |
| H04L 12/40 | (2006.01) |
| H04N 5/235 | (2006.01) |
| H04N 1/028 | (2006.01) |
| H04N 1/024 | (2006.01) |
| H04N 1/00 | (2006.01) |

(52) U.S. Cl.
CPC ... H04N 5/23241 (2013.01); H04L 12/40045 (2013.01); H04N 1/00267 (2013.01); H04N 1/00904 (2013.01); H04N 1/0282 (2013.01); H04N 1/02409 (2013.01); H04N 5/2253 (2013.01); H04N 5/2254 (2013.01); H04N 5/2256 (2013.01); H04N 5/2354 (2013.01); H04N 2201/0041 (2013.01); H04N 2201/0049 (2013.01); H04N 2201/0081 (2013.01); H04N 2201/0436 (2013.01)

(58) Field of Classification Search
CPC .................................... H04N 5/23241
USPC .................................. 348/370–372
See application file for complete search history.

(56) References Cited

U.S. PATENT DOCUMENTS

| | | | | |
|---|---|---|---|---|
| 2003/0147003 | A1* | 8/2003 | Kawase | H04N 1/00912 348/371 |
| 2005/0088931 | A1 | 4/2005 | Takeuchi et al. | |
| 2005/0240784 | A1 | 10/2005 | Sugasawa | |
| 2006/0221778 | A1* | 10/2006 | Nakamura | G11B 7/0946 369/30.01 |
| 2008/0037979 | A1* | 2/2008 | Guthrie | G03B 7/26 396/205 |

(Continued)

FOREIGN PATENT DOCUMENTS

| | | |
|---|---|---|
| JP | 2005-63355 A | 3/2005 |
| JP | 2005-78340 A | 3/2005 |

(Continued)

*Primary Examiner* — Anthony J Daniels
(74) *Attorney, Agent, or Firm* — Oliff PLC

(57) ABSTRACT

A document camera which operates with electric power supplied via a USB cable includes: an image pickup unit which picks up an image of a subject via a lens; a light source unit which emits light toward the subject; a drive unit which drives the lens; a detection unit which detects an amount of current supplied via the USB cable; and a control unit which controls an operation of the light source unit and the drive unit according to the amount of current detected by the detection unit.

8 Claims, 4 Drawing Sheets

(56) References Cited

U.S. PATENT DOCUMENTS

| | | | | |
|---|---|---|---|---|
| 2010/0188585 A1* | 7/2010 | Ichieda | ............... | H04N 9/3105 |
| | | | | 348/708 |
| 2010/0315920 A1* | 12/2010 | Hua | ...................... | G11B 19/20 |
| | | | | 369/47.38 |
| 2010/0328506 A1* | 12/2010 | Giebel | ............... | G06K 7/10732 |
| | | | | 348/294 |
| 2014/0042814 A1* | 2/2014 | Kather | ...................... | H02J 7/34 |
| | | | | 307/59 |
| 2014/0245036 A1* | 8/2014 | Oishi | ...................... | H02J 50/80 |
| | | | | 713/300 |
| 2015/0095669 A1* | 4/2015 | Iwamoto | ................. | G06F 1/263 |
| | | | | 713/310 |
| 2017/0150451 A1* | 5/2017 | Perakamppi | ...... | H04W 52/0277 |

FOREIGN PATENT DOCUMENTS

| JP | 2005-316593 A | 11/2005 |
|---|---|---|
| JP | 2007-74535 A | 3/2007 |
| JP | 2013-97732 A | 5/2013 |

* cited by examiner

DOCUMENT CAMERA, METHOD FOR CONTROLLING DOCUMENT CAMERA, AND ELECTRONIC APPARATUS

CROSS-REFERENCE TO RELATED APPLICATION

The entire disclosure of Japanese Patent Application No. 2017-105176, filed May 29, 2017 is expressly incorporated by reference herein.

BACKGROUND

1. Technical Field

The present invention relates to a document camera, a method for controlling a document camera, and an electronic apparatus.

2. Related Art

According to the related art, a document camera which picks up an image of a subject such as a sheet surface (an example of an electronic apparatus) has been proposed. The document camera transmits image data representing an image resulting from image pickup to a display device such as a projector or personal computer via a USB signal cable or the like. If such a document camera is provided with a power cable to acquire electric power necessary for the document camera to operate separately from the signal cable to transmit image data to the display device, the number of cables connected to the document camera increases and this may make the document camera less user-friendly. Thus, for the document camera, a configuration to receive electric power necessary for the document camera to operate, using a USB signal cable or the like, has been proposed (see, for example, JP-A-2013-097732).

Incidentally, an upper limit value (an example of a "predetermined threshold") of the amount of current that can be supplied via a USB cable is defined by the USB standard. Therefore, when electric power is supplied to the document camera via a USB cable, the operation of the document camera needs to be limited in advance so that the current consumed by the document camera will not exceed the upper limit value of the amount of current that can be supplied via the USB cable.

However, in limiting the operation of the document camera in advance, variation in the amount of current consumed by the document camera need to be considered. In this case, the maximum value of the amount of current consumed by the document camera is restrained to a value lower than the upper limit value of the amount of current that can be supplied via the USB cable, by the amount of a margin corresponding to the variation in the amount of current consumed by the document camera. That is, in limiting the operation of the document camera in advance, there is a possibility that the amount of current that can be consumed by the document camera may drop significantly below the upper limit value of the amount of current that can be supplied via the USB cable.

SUMMARY

An advantage of some aspects of the invention is that a technique by which the maximum value of the amount of current consumed by a document camera which operates with electric power supplied via a USB cable can be made closer to the upper limit value of the amount of current that can be supplied via the USB cable is provided.

A document camera according to an aspect of the invention which operates with electric power supplied via a USB cable includes: an image pickup unit which picks up an image of a subject via a lens; a light source unit which emits light toward the subject; a drive unit which drives the lens; a detection unit which detects an amount of current supplied via the USB cable; and a control unit which controls an operation of the light source unit and the drive unit according to the amount of current detected by the detection unit.

With this configuration, the operation of the light source unit and the drive unit is controlled according to the result of detecting the amount of current supplied via the USB cable. Therefore, it is easier to bring the amount of current consumed by the document camera closer to the upper limit value of the amount of current that can be supplied via the USB cable, than in the case where the operation of the light source unit and the drive unit is controlled without detecting the amount of current supplied via the USB cable.

In the document camera, the control unit may control the operation of the light source unit and the drive unit so that the amount of current detected by the detection unit does not exceed a predetermined threshold.

According to the aspect with this configuration, the amount of current consumed by the document camera can be prevented from exceeding the upper limit value of the amount of current that can be supplied via the USB cable.

In the document camera, the control unit may limit brightness of light emitted from the light source unit so that the amount of current detected by the detection unit does not exceed a predetermined threshold.

According to the aspect with this configuration, the amount of current consumed by the document camera can be limited without limiting the driving of the lens by the drive unit.

In the document camera, the control unit may reduce brightness of light emitted from the light source unit according to an increase in an amount of driving by the drive unit so that the amount of current detected by the detection unit does not exceed a predetermined threshold.

According to the aspect with this configuration, the amount of current consumed by the document camera can be limited while the drive unit freely drives the lens.

In the document camera, the drive unit may have a voice coil motor. The lens may move to a position corresponding to an amount by which the voice coil motor is driven. The control unit may limit the amount by which the voice coil motor is driven so that the amount of current detected by the detection unit does not exceed a predetermined threshold.

According to the aspect with this configuration, the amount of current consumed by the document camera can be limited without limiting the brightness of the light emitted from the light source unit.

In the document camera, the drive unit may have a voice coil motor. The lens may move to a position corresponding to an amount by which the voice coil motor is driven. The control unit may reduce the amount by which the voice coil motor is driven according to an increase in brightness of light emitted from the light source unit so that the amount of current detected by the detection unit does not exceed a predetermined threshold.

According to the aspect with this configuration, it is possible to limit the amount of current consumed by the document camera while maintaining the state where the brightness of the light emitted from the light source unit is freely adjustable.

The document camera may include an operation accepting unit which accepts an operation to designate that one of the light source unit and the drive unit is allowed to operate preferentially, from a user of the document camera. When the operation accepting unit accepts the operation, the control unit may limit the operation of the other of the light source unit and the drive unit and not limit the operation of the one of the light source unit and the drive unit so that the amount of current detected by the detection unit does not exceed a predetermined threshold.

According to the aspect with this configuration, the amount of current consumed by the document camera can be limited without limiting the operation of the component designated by the user of the document camera, of the light source unit or the drive unit.

A method for controlling a document camera according to another aspect of the invention is a method for controlling a document camera that includes an image pickup unit which picks up an image of a subject via a lens, a light source unit which emits light toward the subject, and a drive unit which drives the lens, and the document camera operates with electric power supplied via a USB cable. The method includes: detecting an amount of current supplied via the USB cable; and controlling an operation of the light source unit and the drive unit according to the detected amount of current.

With this configuration, the operation of the light source unit and the drive unit is controlled according to the result of detecting the amount of current supplied via the USB cable. Therefore, it is easier to bring the amount of current consumed by the document camera closer to the upper limit value of the amount of current that can be supplied via the USB cable, than in the case where the operation of the light source unit and the drive unit is controlled without detecting the amount of current supplied via the USB cable.

An electronic apparatus according to another aspect of the invention which operates with electric power supplied via a USB cable includes: a first operation unit; a second operation unit; a detection unit which detects an amount of current supplied via the USB cable; and a control unit which controls an operation of the first operation unit and the second operation unit according to a result of detection by the detection unit.

With this configuration, the operation of the first operation unit and the second operation unit is controlled according to the result of detecting the amount of current supplied via the USB cable. Therefore, it is easier to bring the amount of current consumed by the document camera closer to the upper limit value of the amount of current that can be supplied via the USB cable, than in the case where the operation of the first operation unit and the second operation unit is controlled without detecting the amount of current supplied via the USB cable.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. Embodiment

Hereinafter, an embodiment of the invention will be described with reference to the drawings. In the illustrations, the dimension and scale of each part are different from the actual dimension and scale, where appropriate. In the embodiment below, which is a preferable specific example of the invention, various technically preferable limitations are described. However, the scope of the invention is not limited to these configurations unless the following description includes any particular description to limit the invention.

1. Configuration of Display System

Hereinafter, an outline of a display system SYS according to this embodiment will be described, referring to FIGS. 1 and 2.

Figure 1:
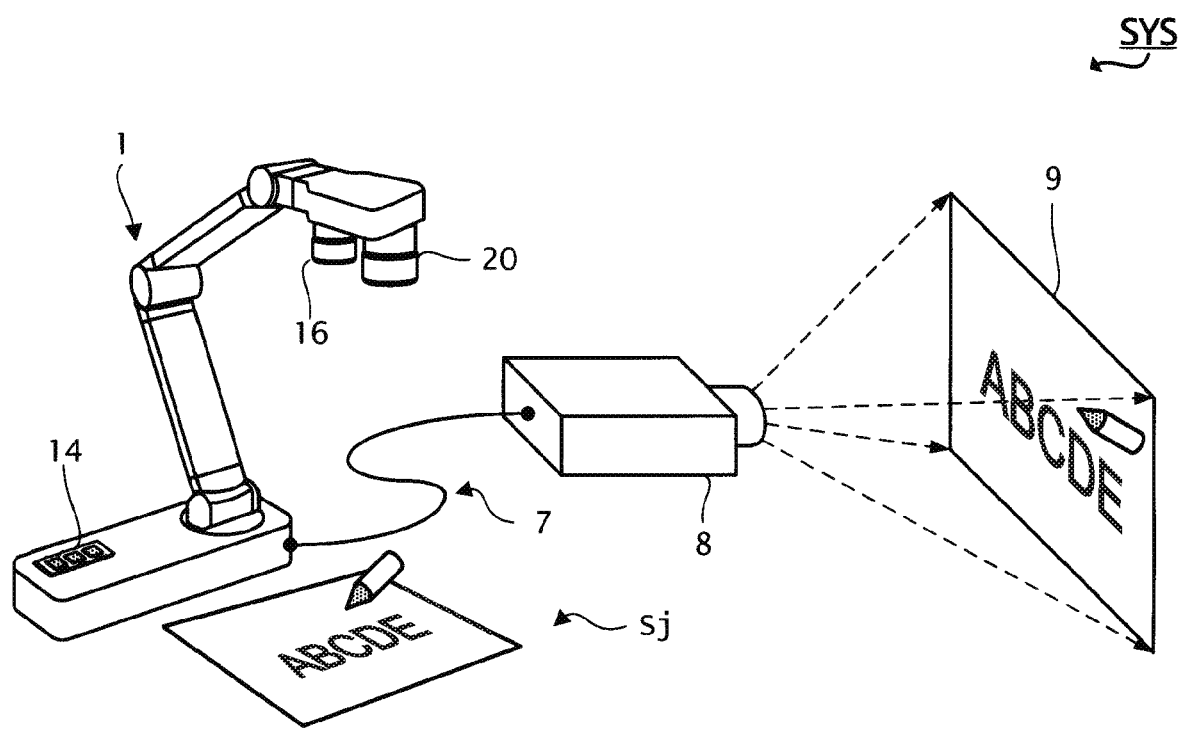
FIG. 1 is an explanatory view showing an example of a display system SYS according to an embodiment of the invention.

FIG. 1 is an explanatory view for explaining an example of the configuration of the display system SYS according to this embodiment. As shown in FIG. 1, the display system SYS includes a document camera 1 to pick up an image of a subject Sj, and a projector 8 which projects an image acquired as a result of image pickup by the document camera 1, onto a projection surface 9.

The document camera 1 has an image pickup unit 20 to pick up an image of the subject Sj and supplies image data Img representing an image acquired as a result of image pickup of the subject Sj by the image pickup unit 20, to the projector 8 via a USB (universal serial bus) cable 7. The document camera 1 also has a light source unit 16 to cast light on the subject Sj, and an operation accepting unit 14 to accept an operation by a user of the document camera 1. In this embodiment, the document camera 1 is a so-called USB connection apparatus which operates with electric power supplied from the projector 8 via the USB cable 7.

The projector 8 projects an image corresponding to the image data Img supplied from the document camera 1 via the USB cable 7, onto the projection surface 9 such as a screen or wall.

2. Configuration of Document Camera

Next, the configuration of the document camera 1 according to the embodiment will be described, referring to FIG. 2.

Figure 2:
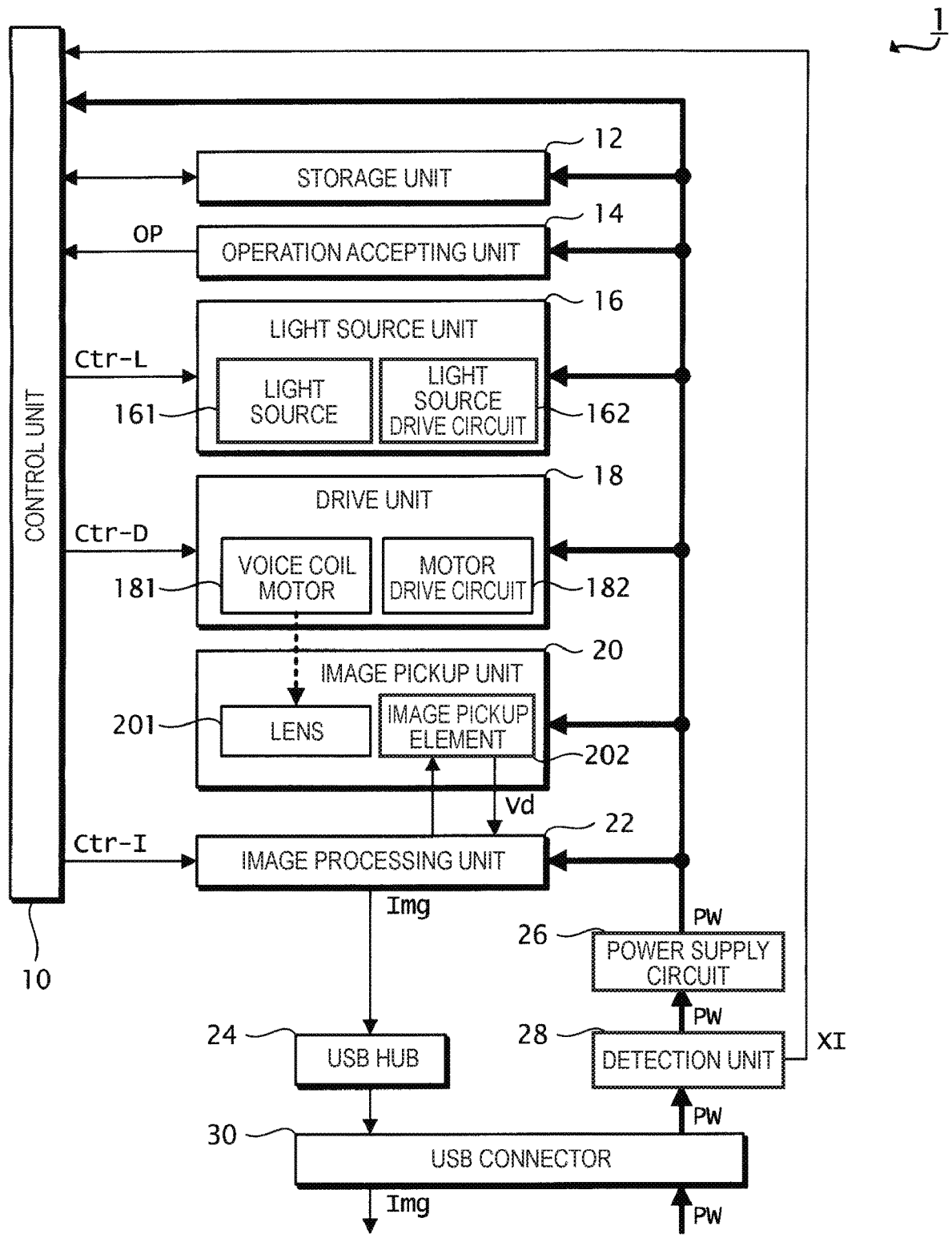
FIG. 2 is a block diagram showing an example of the configuration of a document camera 1.

FIG. 2 is a block diagram showing an example of the configuration of the document camera 1 according to the embodiment. As shown in FIG. 2, in addition to the operation accepting unit 14, the light source unit 16, and the image pickup unit 20 as described above, the document camera 1 includes a control unit 10 which controls each part of the document camera 1, a storage unit 12 which stores various kinds of information, a drive unit 18 to drive the image pickup unit 20, an image processing unit 22 which generates the image data Img based on the result of image pickup by the image pickup unit 20, a USB connector 30 connected to the USB cable 7, a USB hub 24 electrically connected to the USB connector 30, a detection unit 28 which detects the amount of current supplied via the USB cable 7, and a power supply circuit 26 which supplies electric power PW supplied via the USB cable 7, to each part of the document camera 1.

The storage unit 12 includes, for example, one or both of a volatile memory such as a RAM (random access memory) and a non-volatile memory such as a PROM (programmable ROM). The storage unit 12 has various kinds of information stored therein, including a control program of the document camera 1.

The control unit 10 includes, for example, an MPU (micro-processing unit). The MPU of the control unit 10 executes the control program stored in the storage unit 12 and operates according to the control program. The control unit thus controls each part of the document camera 1. Specifically, the control unit 10 outputs various control signals including a control signal Ctr-L to control the light source unit 16, a control signal Ctr-D to control the drive unit 18, and a control signal Ctr-I to control the image processing unit 22, and thus controls the operation of each part of the document camera 1.

Here, the control signal Ctr-L is, for example, a signal which designates the brightness of the light emitted from the light source unit 16. The control signal Ctr-D is, for example, a signal which designates the amount of driving by the drive unit 18. The control signal Ctr-I is, for example, a signal which designates the timing of various kinds of processing by the image processing unit 22, a signal which designates the start and end of image pickup to the image pickup unit 20 via the image processing unit 22, or the like.

The image pickup unit 20 has a lens 201 and an image pickup element 202 which detects light incident from the subject Sj via the lens 201 and outputs a picked-up image signal Vd representing the result of the detection.

The light source unit 16 has a light source 161 such as an LED (light emitting diode) which emits light, and a light source drive circuit 162 which drives the light source 161. Of these, the light source drive circuit 162 adjusts the amount of current or the like supplied to the light source 161, based on the control signal Ctr-L, and thus drives the light source 161 so that the light source 161 emits light with the brightness corresponding to the control signal Ctr-L.

The drive unit 18 has a voice coil motor 181 capable of driving the lens 201 so as to change the position of the lens 201, and a motor drive circuit 182 which drives the voice coil motor 181.

Of these, the motor drive circuit 182 adjusts the amount of current or the like supplied to the voice coil motor 181, based on the control signal Ctr-D, and thus drives the voice coil motor 181 by the amount of driving corresponding to the control signal Ctr-D.

The voice coil motor 181 has, for example, a magnet and a coil, and can change the relative distance between the coil and the magnet according to the amount of current flowing through the coil. Therefore, for example, the magnet of the voice coil motor 181 maybe fixed to a frame (not illustrated) of the document camera 1, and the coil of the voice coil motor 181 may be fixed to the lens 201. This enables the lens 201 to be displaced (fed) from a reference position of the lens 201 by the distance corresponding to the amount of current supplied to the voice coil motor 181.

The image processing unit 22 includes, for example, an ISP (image signal processor). The image processing unit operates according to the control signal Ctr-I, thus generates the image data Img representing the subject Sj whose image is picked up by the image pickup unit 20, based on the picked-up image signal Vd outputted from the image pickup element 202, and outputs the generated image data Img to the USB cable 7 via the USB hub 24 and the USB connector 30.

The detection unit 28 detects the amount of current supplied via the USB cable 7 and outputs a detection signal XI representing the result of the detection.

The operation accepting unit 14 accepts an operation by the user of the document camera 1 and outputs an operation signal OP representing the content of the operation.

In this embodiment, the operation by the user of the document camera 1 includes an operation to turn on the power of the document camera 1, an operation to turn off the power of the document camera 1, an operation to adjust the position of the lens 201 in the image pickup unit 20, an operation to adjust the brightness of the light emitted from the light source unit 16, and an operation to designate that one of the light source unit 16 and the drive unit 18 is allowed to operate preferentially (hereinafter referred to as "priority operation"). In the embodiment, the priority operation includes an operation to designate that the drive unit 18 is allowed to operate preferentially, and an operation to designate that the light source unit 16 is allowed to operate preferentially.

If the user of the document camera 1 designates that the drive unit 18 is allowed to operate preferentially, the control unit 10 sets a lens position priority mode as the operation mode of the document camera 1. Meanwhile, if the user of the document camera 1 designates that the light source unit 16 is allowed to operate preferentially, the control unit 10 sets a brightness priority mode as the operation mode of the document camera 1. The control unit 10 causes the storage unit 12 to store information representing the type of the operation mode thus set.

The lens position priority mode is an operation mode of the document camera 1 in which electric power is allocated preferentially to the drive unit 18 over the light source unit 16, thus allowing the drive unit 18 to operate preferentially over the light source unit 16, so that the adjustment of the position of the lens 201 in the image pickup unit 20 is given priority over the securing of the brightness of the light emitted from the light source unit 16. The brightness priority mode is an operation mode of the document camera 1 in which electric power is allocated preferentially to the light source unit 16 over the drive unit 18, thus allowing the light source unit 16 to operate preferentially over the drive unit 18, so that the securing of the brightness of the light emitted from the light source unit 16 is given priority over the adjustment of the position of the lens 201 in the image pickup unit 20.

In the embodiment, after the power of the document camera 1 is turned on, the lens position priority mode is set as the operation mode of the document camera 1 until the user of the document camera 1 carries out a priority operation.

3. Operation of Document Camera

Next, the operation of the document camera 1 according to the embodiment will be described, referring to FIG. 3.

Figure 3:
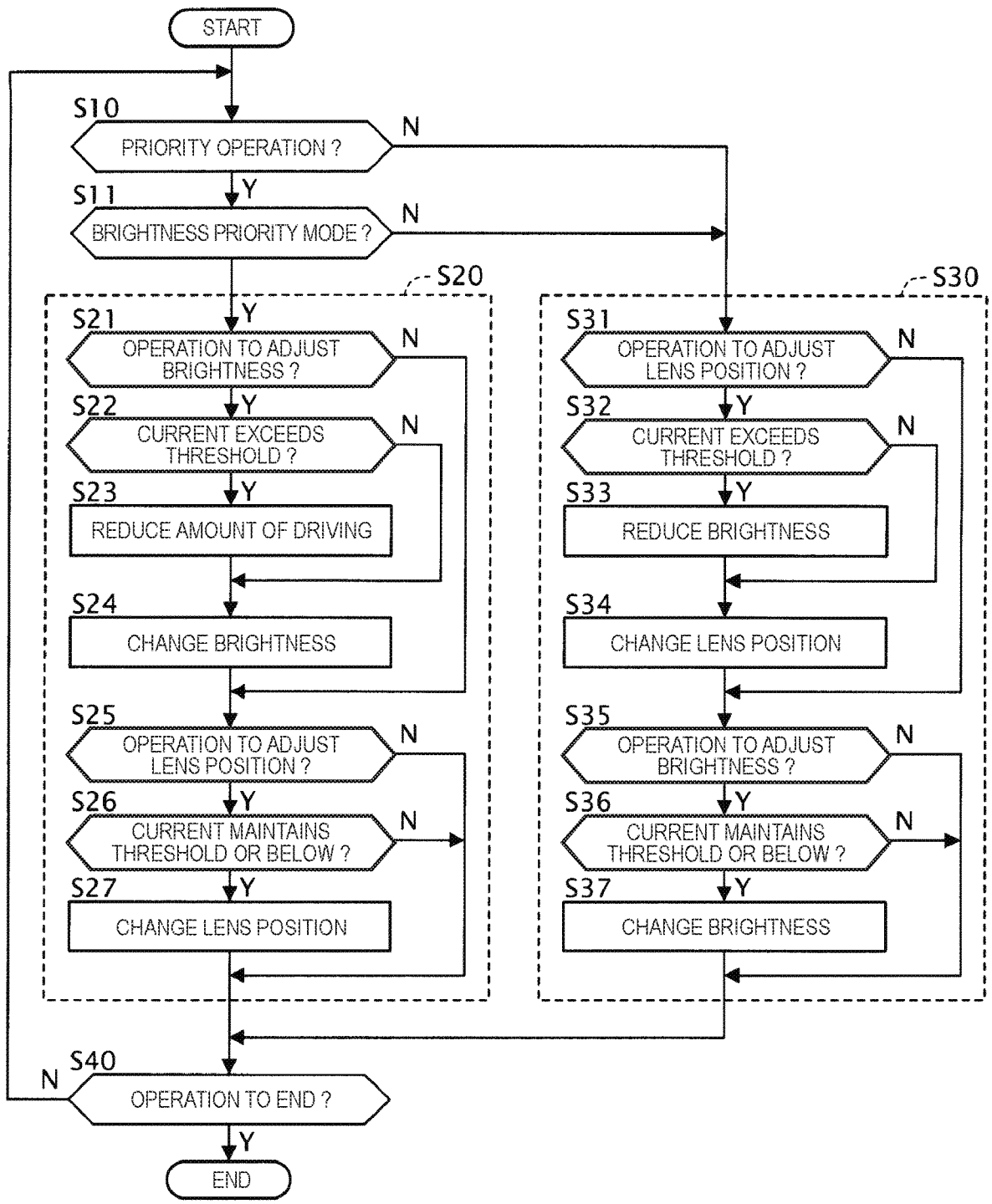
FIG. 3 is a flowchart showing an example of the operation of the document camera 1.

FIG. 3 is a flowchart for explaining the operation of the document camera 1. The series of processes shown in FIG. 3 is started when the user of the document camera 1 operates the operation accepting unit 14 to turn on the power of the document camera 1.

As shown in FIG. 3, the control unit 10 of the document camera 1 determines whether a priority operation is carried out or not, after the power of the document camera 1 is turned on (step S10).

If the result of the determination in step S10 is positive, the control unit 10 determines whether the operation mode set by the priority operation is the brightness priority mode or not (step S11).

If the result of the determination in step S11 is positive, the control unit 10 controls each part of the document camera 1 according to the brightness priority mode (step S20).

When the document camera 1 operates in the brightness priority mode (step S20), the control unit 10 first determines whether the operation accepting unit 14 has accepted an operation to adjust the brightness of the light or not (step S21).

If the result of the determination in step S21 is positive, the control unit 10 determines whether the current value represented by a detection signal XI exceeds a predetermined threshold Xth or not, on the assumption that the brightness of the light emitted from the light source unit 16 is changed to the brightness corresponding to the operation in step S21 (step S22). In this embodiment, the predetermined threshold Xth is assumed to be the upper limit value (for example, 500 mA) of the amount of current that can be supplied via the USB cable 7, defined by the USB standard. However, the invention is not limited to such a configuration. The predetermined threshold Xth may be any non-negative value equal to or below the upper limit value of the amount of current that can be supplied via the USB cable 7. If the result of the determination in step S21 is negative, the control unit 10 proceeds to step S25.

If the result of the determination in step S22 is positive, the control unit 10 outputs a control signal Ctr-D to designate that the amount of driving by the drive unit 18 is reduced (step S23). More specifically, in step S23, the control unit 10 outputs a control signal Ctr-D to control the drive unit 18 in such a way that the detection signal XI does not exceed the predetermined threshold Xth even when the brightness of the light emitted from the light source unit 16 is changed to the brightness corresponding to the operation in step S21. If the result of the determination in step S22 is negative, the control unit 10 proceeds to step S24.

Next, the control unit 10 outputs a control signal Ctr-L to change the brightness of the light emitted from the light source unit 16 to the brightness corresponding to the operation in step S21 (step S24).

Next, the control unit 10 determines whether the operation accepting unit 14 has accepted an operation to adjust the position of the lens 201 or not (step S25).

If the result of the determination in step S25 is positive, the control unit 10 determines whether the current value represented by the detection signal XI maintains the value equal to or below the predetermined threshold Xth or not, on the assumption that the drive unit 18 drives the lens 201 to move to the position corresponding to the operation in step S25 (step S26). If the result of the determination in step S25 is negative, the control unit 10 proceeds to step S40.

If the result of the determination in step S26 is positive, the control unit 10 outputs a control signal Ctr-D to designate that the drive unit 18 is made to drive the lens 201 to move to the position corresponding to the operation in step S25 (step S27). If the result of the determination in step S26 is negative, the control unit 10 proceeds to step S40.

If the result of the determination in step S10 is negative, or if the result of the determination in step S11 is negative, the control unit 10 controls each part of the document camera 1 according to the lens position priority mode (step S30).

When the document camera 1 operates in the lens position priority mode (step S30), the control unit 10 first determines whether the operation accepting unit 14 has accepted an operation to adjust the position of the lens 201 or not (step S31).

If the result of the determination in step S31 is positive, the control unit 10 determines whether the current value represented by the detection signal XI exceeds the predetermined threshold Xth or not, on the assumption that the drive unit 18 drives the lens 201 to move to the position corresponding to the operation in step S31 (step S32). If the result of the determination in step S31 is negative, the control unit 10 proceeds to step S35.

If the result of the determination in step S32 is positive, the control unit 10 outputs a control signal Ctr-L to designate that the brightness of the light emitted from the light source unit 16 is reduced (step S33). More specifically, in step S33, the control unit 10 outputs a control signal Ctr-L to control the light source unit 16 in such a way that the detection signal XI does not exceed the predetermined threshold Xth even when the drive unit 18 drives the lens 201 to move to the position corresponding to the operation in step S31. If the result of the determination in step S32 is negative, the control unit 10 proceeds to step S34.

Next, the control unit 10 outputs a control signal Ctr-D to designate that the drive unit 18 is made to drive the lens 201 to move to the position corresponding to the operation in step S31 (step S34).

Next, the control unit 10 determines whether the operation accepting unit 14 has accepted an operation to adjust the brightness of the light or not (step S35).

If the result of the determination in step S35 is positive, the control unit 10 determines whether the current value represented by the detection signal XI maintains the value equal to or below the predetermined threshold Xth or not, on the assumption that the brightness of the light emitted from the light source unit 16 is changed to the brightness corresponding to the operation in step S35 (step S36). If the result of the determination in step S35 is negative, the control unit 10 proceeds to step S40.

If the result of the determination in step S36 is positive, the control unit 10 outputs a control signal Ctr-L to change the brightness of the light emitted from the light source unit 16 to the brightness corresponding to the operation in step S35 (step S37). If the result of the determination in step S36 is negative, the control unit 10 proceeds to step S40.

Subsequently, the control unit 10 determines whether the operation accepting unit 14 has accepted an operation to turn off the power of the document camera 1 or not (step S40).

If the result of the determination in step S40 is positive, the control unit 10 ends the processing shown in FIG. 3. Meanwhile, if the result of the determination in step S40 is negative, the control unit 10 proceeds to step S10.

4. Conclusions of Embodiment

As described above, in the document camera 1 according to the embodiment, the control unit 10 generates a control signal Ctr-L to control the light source unit 16 and a control signal Ctr-D to control the drive unit 18, according to the amount of current represented by the detection signal XI. Therefore, the control unit 10 can bring the amount of current consumed by the document camera 1 closer to the upper limit value of the amount of current that can be supplied via the USB cable 7, than in the case of controlling the light source unit 16 and the drive unit 18 without using the detection signal XI.

In the lens position priority mode of the document camera 1 according to the embodiment, the brightness of the light emitted from the light source unit 16 is changed so that the amount of current represented by the detection signal XI does not exceed the predetermined threshold Xth even when the drive unit 18 is made to drive the lens 201 to change the position of the lens 201 (see step S33 in FIG. 3). Therefore, the embodiment makes it possible to freely change the position of the lens 201 while maintaining the state where the current value represented by the detection signal XI does not exceed the predetermined threshold Xth.

In the lens position priority mode of the document camera 1 according to the embodiment, the brightness of the light emitted from the light source unit 16 is changed unless the amount of current represented by the detection signal XI exceeds the predetermined threshold Xth (see step S36 in FIG. 3). Therefore, the embodiment makes it possible to prevent the amount of current represented by the detection signal XI from exceeding the predetermined threshold Xth due to the change in the brightness of the light emitted from the light source unit 16.

In the brightness priority mode of the document camera 1 according to the embodiment, the amount of driving by the drive unit 18 is changed so that the amount of current represented by the detection signal XI does not exceed the predetermined threshold Xth even when the brightness of the light emitted from the light source unit 16 is changed (see step S23 in FIG. 3). Therefore, the embodiment makes it possible to freely change the brightness of the light emitted from the light source unit 16 while maintaining the state where the current value represented by the detection signal XI does not exceed the predetermined threshold Xth.

In the brightness priority mode of the document camera 1 according to the embodiment, the position of the lens 201 is changed unless the amount of current represented by the detection signal XI exceeds the predetermined threshold Xth (see step S26 in FIG. 3). Therefore, the embodiment makes it possible to prevent the amount of current represented by the detection signal XI from exceeding the predetermined threshold Xth due to the change of the position of the lens 201.

In the document camera 1 according to the embodiment, the lens position priority mode is set as the operation mode of the document camera 1 unless a priority operation by the user of the document camera 1 is carried out (see step S10 in FIG. 3). Therefore, the position of the lens 201 can be prevented from being changed against the intention of the user of the document camera 1.

B. Modifications

Each configuration described above can be modified in various ways. Specific modifications will be described below. Two or more configurations arbitrarily selected from the description below can be properly combined together unless they contradict each other.

Modification 1

In the embodiment, the document camera 1 can operate in the two operation modes, that is, the lens position priority mode and the brightness priority mode. However, the invention is not limited to such a configuration. The document camera 1 may be able to operate at least in the lens position priority mode.

Figure 4:
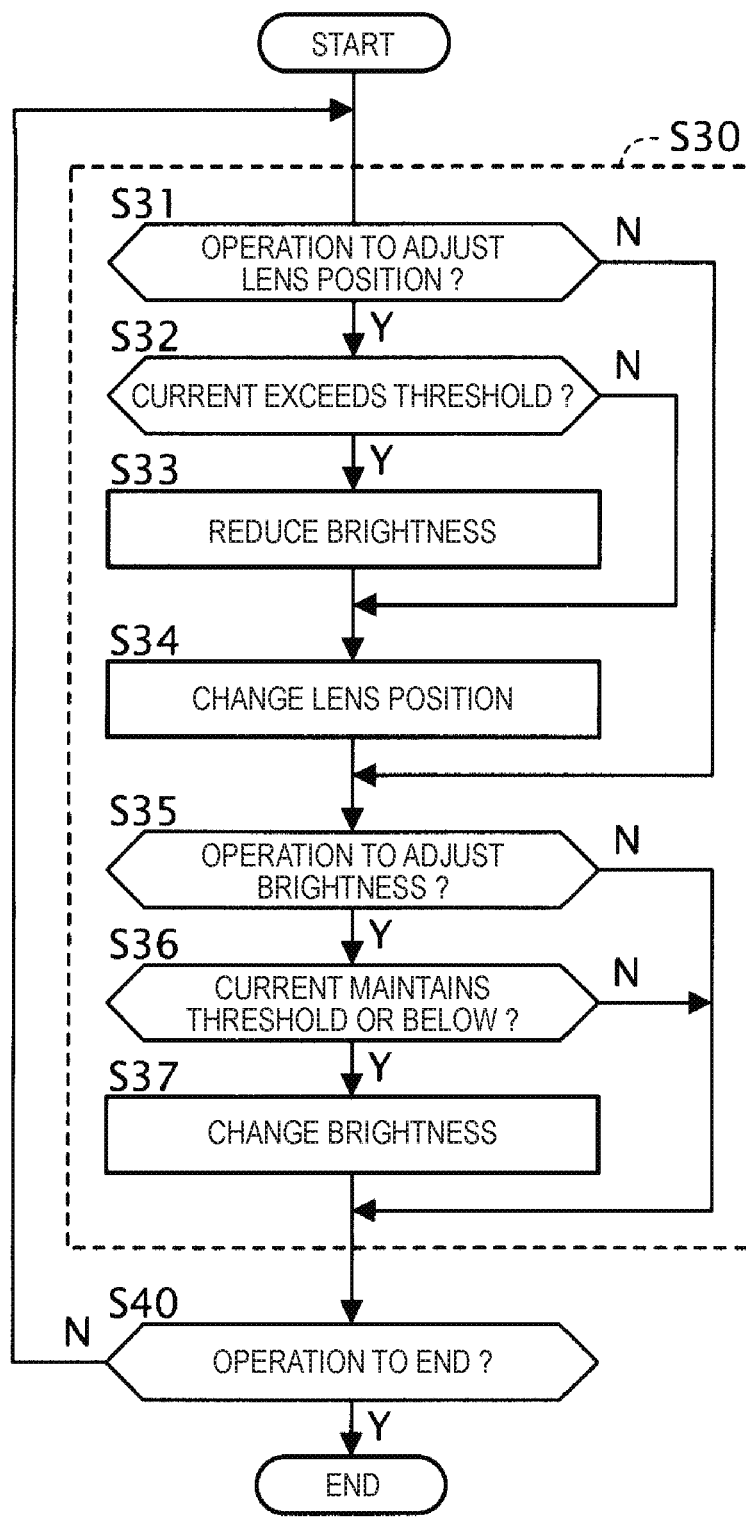
FIG. 4 is a flowchart showing an example of the operation of a document camera according to Modification 1.

FIG. 4 is a flowchart for explaining the operation of the document camera according to Modification 1. The flowchart shown in FIG. 4 is different from the flowchart shown in FIG. 3 in that the processing of steps S10, S11 and S20 is not executed.

As shown in FIG. 4, in the document camera according to Modification 1, the control unit 10 executes processing to control each part of the document camera 1 according to the lens position priority mode (step S30) and processing to determine whether the operation accepting unit 14 has accepted an operation to turn off the power of the document camera 1 or not (step S40), and does not carry out any processing to control each part of the document camera 1 according to the brightness priority mode. Therefore, in the document camera according to Modification 1, the position of the lens 201 can be prevented from being changed against the intention of the user of the document camera 1.

Modification 2

In the foregoing embodiment and modification, the display system SYS has the projector 8 to display an image represented by image data Img supplied from the document camera 1. However, the invention is not limited to such a configuration. The projector 8 is an example of the display device which displays an image represented by image data Img supplied from the document camera 1. As the display device, for example, a television, personal computer or the like can be employed.

Modification 3

In the foregoing embodiment and modifications, the display system SYS has the document camera 1. However, the invention is not limited to such a configuration. The document camera 1 is an example of the electronic apparatus which operates with electric power supplied from the display device such as the projector 8 via the USB cable 7. The light source unit 16 and the drive unit 18 provided in the document camera are an example of the first operation unit and second operation unit which operate with electric power supplied from the display device via the USB cable 7.

What is claimed is:

1. A camera which operates with electric power supplied via a USB cable, the camera comprising:
    an image pickup unit which picks up an image of a subject via a lens;
    a light source unit which emits light toward the subject;
    a drive unit which drives the lens;
    a detection unit which detects an amount of current supplied via the USB cable; and
    a control unit which controls an operation of the light source unit and the drive unit according to the amount of current detected by the detection unit.

2. The camera according to claim 1, wherein
    the control unit controls the operation of the light source unit and the drive unit so that the amount of current detected by the detection unit does not exceed a predetermined threshold.

3. The camera according to claim 1, wherein
    the control unit limits brightness of light emitted from the light source unit so that the amount of current detected by the detection unit does not exceed a predetermined threshold.

4. The camera according to claim 1, wherein
    the control unit reduces brightness of light emitted from the light source unit according to an increase in an amount of driving by the drive unit so that the amount of current detected by the detection unit does not exceed a predetermined threshold.

5. The camera according to claim 1, wherein
    the drive unit has a voice coil motor,
    the lens moves to a position corresponding to an amount by which the voice coil motor is driven, and
    the control unit limits the amount by which the voice coil motor is driven so that the amount of current detected by the detection unit does not exceed a predetermined threshold.

6. The camera according to claim 1, wherein
    the drive unit has a voice coil motor,
    the lens moves to a position corresponding to an amount by which the voice coil motor is driven, and the control unit reduces the amount by which the voice coil motor is driven according to an increase in brightness of light emitted from the light source unit so that the amount of current detected by the detection unit does not exceed a predetermined threshold.

7. The camera according to claim 1, further comprising an operation accepting unit which accepts an operation to designate that one of the light source unit and the drive unit is allowed to operate preferentially, from a user of the camera, wherein when the operation accepting unit accepts the operation, the control unit limits the operation of the other of the light source unit and the drive unit and does not limit the operation of the one of the light source unit and the drive unit so that the amount of current detected by the detection unit does not exceed a predetermined threshold.

8. A method for controlling a camera, the camera including: (i) an image pickup unit which picks up an image of a subject via a lens;(ii) a light source unit which emits light toward the subject; and (iii) a drive unit which drives the lens, the camera operating with electric power supplied via a USB cable, the method comprising:

detecting an amount of current supplied via the USB cable; and controlling an operation of the light source unit and the drive unit according to the detected amount of current.

* * * * *